US012567073B1

(12) United States Patent
Sharma et al.

(10) Patent No.: US 12,567,073 B1
(45) Date of Patent: Mar. 3, 2026

(54) BIOMETRIC AUTHENTICATION FOR ONE-CLICK CHECKOUT

(71) Applicant: Bolt Financial, Inc., San Francisco, CA (US)

(72) Inventors: Ashish Sharma, Washington, DC (US); Jake William Chiang, San Francisco, CA (US)

(73) Assignee: Bolt Financial, Inc., San Francisco, CA (US)

( * ) Notice: Subject to any disclaimer, the term of this patent is extended or adjusted under 35 U.S.C. 154(b) by 143 days.

(21) Appl. No.: 18/334,175

(22) Filed: Jun. 13, 2023

(51) Int. Cl.
G06Q 30/00 (2023.01)
G06Q 20/38 (2012.01)
G06Q 20/40 (2012.01)

(52) U.S. Cl.
CPC ... *G06Q 20/40145* (2013.01); *G06Q 20/3829* (2013.01)

(58) Field of Classification Search
CPC .............................................. G06Q 20/40145
USPC ..... 705/44, 1.1, 40, 35, 41, 14.33, 14.51, 17
See application file for complete search history.

(56) References Cited

U.S. PATENT DOCUMENTS

| | | | | |
|---|---|---|---|---|
| 11,080,701 | B2 * | 8/2021 | Scott | ..................... G06Q 20/40 |
| 2015/0347734 | A1 * | 12/2015 | Beigi | ................... H04L 9/3268 |
| | | | | 726/28 |

OTHER PUBLICATIONS

ProQuestDialogNPL Search History.*
ip.com NPL Search History.*

* cited by examiner

*Primary Examiner* — John H. Holly
(74) *Attorney, Agent, or Firm* — Baker Botts L.L.P.

(57) ABSTRACT

In one embodiment, a method includes receiving data associated with a first checkout of a first order, where the data comprises a user identifying information, determining that a user account with a transaction processing system associated with the user identifying information exists, determining that a biometric authentication for the user account is not registered with the transaction processing system, performing an alternative authentication with the transaction processing system, obtaining a unique biometric authentication registration challenge, obtaining an identifier of a credential for biometric authentications, a public key associated with the credential, and a first signature, where the first signature is the unique biometric authentication registration challenge signed by a private key associated with the credential, and sending a biometric authentication registration request comprising the identifier of the credential, the public key associated with the credential, and the first signature.

20 Claims, 7 Drawing Sheets

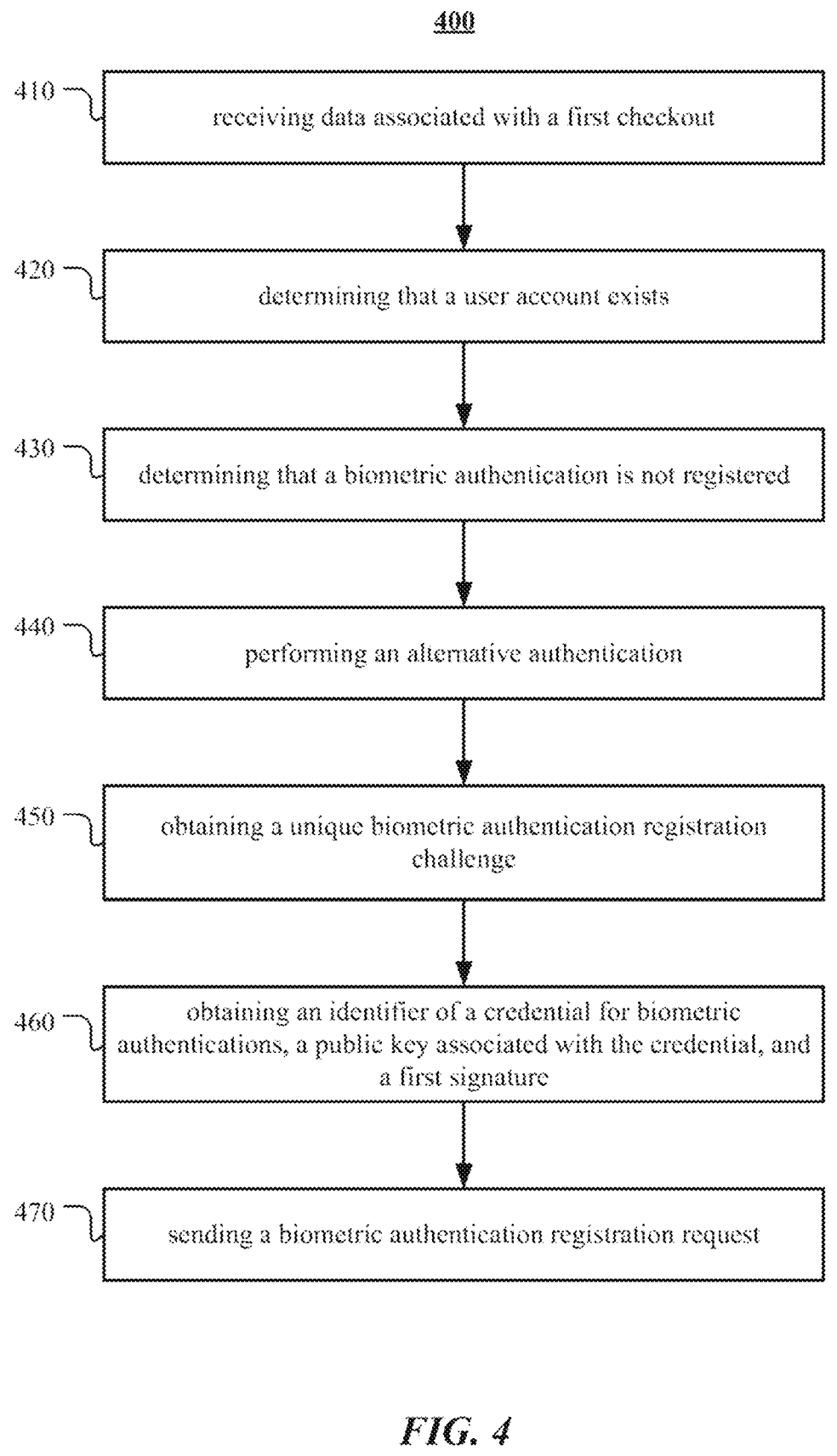

400

| 410 | receiving data associated with a first checkout |

| 420 | determining that a user account exists |

| 430 | determining that a biometric authentication is not registered |

| 440 | performing an alternative authentication |

| 450 | obtaining a unique biometric authentication registration challenge |

| 460 | obtaining an identifier of a credential for biometric authentications, a public key associated with the credential, and a first signature |

| 470 | sending a biometric authentication registration request |

*FIG. 4*

BIOMETRIC AUTHENTICATION FOR ONE-CLICK CHECKOUT

TECHNICAL FIELD

This disclosure generally relates to an identity authentication for completing a transaction.

BACKGROUND

Many online purchases are made by customers through independent merchants. In most cases, merchants allow customers to either register for an account with the merchant or to proceed with a purchase as a "guest." Customers who register for accounts with a merchant often receive benefits, such as expedited process for re-ordering or subsequent ordering, which may be possible because the merchant can store necessary purchase information or easy access to an order history. Customers who make purchases as a guest may be required to re-enter information such as shipping and payment information for each order. This, however, adds additional steps into the customer check-out flow process and makes the process more cumbersome, for example, because customers may prefer not to make additional accounts as they do not wish to be responsible for remembering an additional account name and password for each merchant from which they make purchases. The added burden also discourages customers from taking advantage of the benefits offered by merchant-specific accounts and increases the computing resources typically necessary to complete each subsequent customer order.

Customer discomfort or disinterest involved with creating merchant-specific accounts also creates inefficiencies for merchants. For example, merchants may struggle to identify customers across purchases, decreasing the ability for merchants to accurately recommend products related to previous purchases. Merchants also risk losing or reducing sales because customers may decide against making purchases after being asked to re-enter information that customers deem cumbersome. Merchants must also allocate additional computational resources to develop user interfaces and other user experience features to accommodate return customers to re-enter information necessary for a purchase.

SUMMARY OF PARTICULAR EMBODIMENTS

Embodiments described herein include systems and methods for authenticating a user with a biometric authentication for a one-click checkout, with which stored shipping information and payment information associated with a user identifying information are used for the checkout. Legacy one-click checkout procedures may require One-Time Password (OTP) to be used for authenticating a user. The OTP may require the user to be next to their phone or other device to receive the OTP in order for the user to complete the authentication for the checkout. The user may not complete the checkout when the user does not have a device to receive the OTP. The systems and methods disclosed herein may allow the user to complete the checkout with a biometric information including, but not limited to, face, voice, fingerprint, iris, retina or handwriting without using OTP authentication.

In particular embodiments, an application executed on a client device may receive data associated with a first checkout of a first order. The data may comprise a user identifying information. The application may send the user identifying information to a transaction processing system. The application cation may determine that a user account with the transaction processing system associated with the user identifying information exists upon receiving a response from the transaction processing system indicating that the user account associated with the user identifying information exists. The user account may be associated with one or more user identifying information, shipping information, and payment information that may be used for the first checkout.

In particular embodiments, the application may determine that the client device is capable of a biometric authentication. The application may further determine that the biometric authentication is enabled on the client device. The determinations may be based on configuration information. Upon determining that the client device is capable of the biometric authentication and that the biometric authentication is enabled on the client device, the application may send a request to create a unique biometric authentication challenge to the transaction processing system. The application may determine that the biometric authentication for the user account is not registered with the transaction processing system by receiving a response indicating that biometric authentication for the user account has not been registered with the transaction processing system from the transaction processing system.

In particular embodiments, the application may perform an alternative authentication with the transaction processing system in response to the determination that the biometric authentication for the user account is not registered with the transaction processing system. In particular embodiments, the alternative authentication comprises a One-Time Password (OTP) authentication. For the OTP authentication, the application may send a request to initiate an OTP authentication to the transaction processing system. The request to initiate the OTP authentication may cause the transaction processing system to send an OTP to a user computing device via a communication channel associated with a stored user identifying information for the user account. The application may receive input for the OTP via an input device associated with the client device. The application may send the received input for the OTP to the transaction processing system. The transaction processing system may compare the received input for the OTP with the OTP sent to the user computing device. The transaction processing system determines that the user account associated with the user identifying information is authenticated when the received input for the OTP is identical to the OTP sent to the user computing device. The application may receive a confirmation that the OTP authentication is complete from the transaction processing system.

In particular embodiments, the application may obtain a unique biometric authentication registration challenge from the transaction processing system upon receiving an approval for registering for the biometric authentication with the transaction processing system. The application may request a creation of a credential to a system module on the client device using a create Application Programming Interface (API) provided by the system module. The unique biometric authentication registration challenge may be provided to the system module as a parameter of the create API. Requesting the creation of the credential using the create API may cause the system module to perform the followings: The system module may request a biometric information through one or more output devices associated with the client device. The system module may receive the biometric information via a biometric information input device associated with the system module. The system module may generate an identifier, a private key, and a public key associated with a credential for biometric authentications. The system module may store the identifier, the private key, and the received biometric information in a secure manner. The system module produce a response to the create API, wherein the response comprises the identifier of the credential, the public key associated with the credential, and a first signature. The first signature may be the unique biometric authentication registration challenge signed by a private key associated with the credential. The application may receive the first signature, the identifier of the credential, and the public key associated with the credential as a response to the create API from the system module. The application may send a biometric authentication registration request to the transaction processing system. The biometric authentication registration request may comprise the identifier of the credential, the public key associated with the credential, and the first signature. The application may receive a response to the biometric authentication registration request indicating a successful registration.

In particular embodiments, the application may request a confirmation on the first checkout through one or more output devices. The application may receive an input indicating the confirmation on the first checkout. The application may send a message indicating a confirmation on the first checkout to the transaction processing system. The application may receive a response indicating a successful processing of the first checkout from the transaction processing system.

In particular embodiments, the application may receive data associated with a second checkout of a second order. The data associated with the second checkout may comprise the user identifying information. The application may determine that the user account with the transaction processing system associated with the user identifying information exists. The application may perform a biometric authentication with the transaction processing system. For the biometric authentication with the transaction processing system, the application may obtain a unique biometric authentication challenge from the transaction processing system. The application may obtain a second signature which is the unique biometric authentication challenge signed by the private key from the system module. The application may send the second signature to the transaction processing system. The transaction processing system may verify the second signature by decoding the second signature using the public key associated with the credential. The application may receive a confirmation that the biometric authentication is complete from the transaction processing system. The application may receive user information from the transaction processing system upon completion of the biometric authentication. The user information may comprise one or more user identifying information, shipping information, and payment information associated with the user account. The user information may be used for the second checkout. The application may request a confirmation on the second checkout through one or more output devices. The application may receive an input indicating the confirmation on the second checkout. The application may complete the second checkout by sending a message indicating a confirmation on the second checkout to the transaction processing system. The application may receive a response indicating a successful processing of the second checkout from the transaction processing system.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 4 illustrates an example method for registering a biometric authentication with a transaction processing system.

DESCRIPTION OF EXAMPLE EMBODIMENTS

Figure 1:
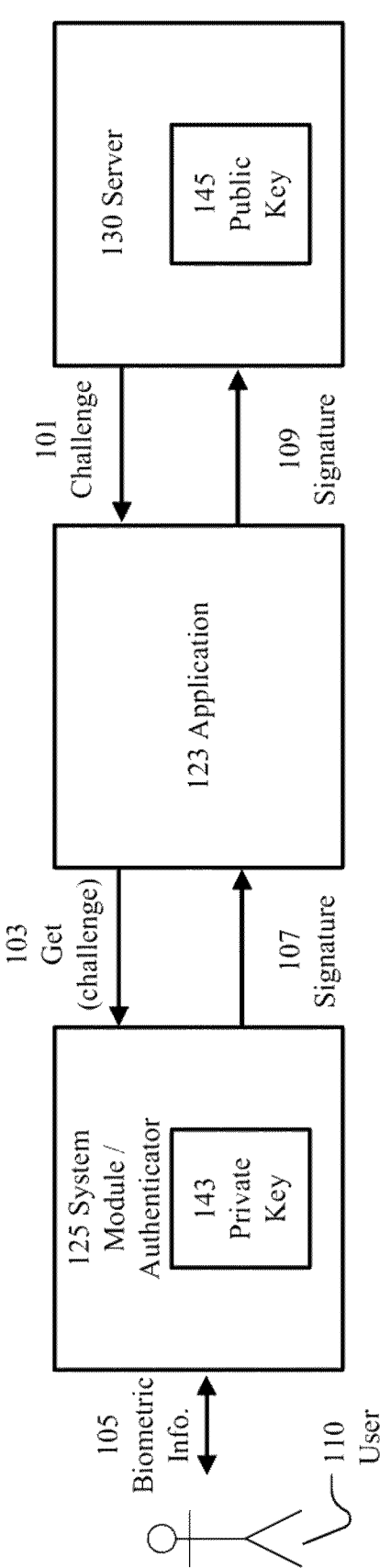
FIG. 1 illustrates an example logical diagram of WebAuthN that depicts how WebAuthN works in a simplified manner.

Particular embodiments disclosed herein may be designed to address specific problems or omissions in the current state of the art as described herein. As described herein, particular embodiments include systems and methods for authenticating a user with a biometric authentication for a one-click checkout, which may involve utilizing shipping information and payment information previously stored for the current checkout. Legacy one-click checkout procedures may require One-Time Password (OTP) to be used for authenticating a user. Typically, the OTP is sent to a device that is different than the device that is being used for a checkout. An example of such a device is a smart phone. And thus, to authenticate via OTP, a user may be required to have the OTP receiving device to be readily available. However, this may be cumbersome for the user since it creates additional friction to the checkout process. The systems and methods disclosed herein may allow the user to complete the checkout with a biometric information including, but not limited to, face, voice, fingerprint, iris, retina or handwriting without going through the typical OTP process.

In particular embodiments, to enable the one-click checkout, a transaction processing system may store one or more user identifying information, shipping information, and payment information associated with a user account when the user account is created. The one or more user identifying information may comprise an email address, a phone number, or any suitable user identifying information. The transaction processing system may create the user account when a first checkout for a first order associated with the user is processed. The transaction processing system may receive a user identifying information in association with a second checkout request. The transaction processing system may determine that the user account associated with the user identifying information exists based on determining that the user identifying information received in association with the second checkout request corresponds to one of the stored one or more user identifying information. The transaction processing system may process the second checkout request using the shipping information and the payment information stored in association with the user account. In particular embodiments, prior to processing the second checkout request using the shipping information and the payment information, the transaction processing system may authenticate the user using one of available authentication methods. More information on the one-click checkout may be found in U.S. patent application Ser. No. 17/240,883, filed 26 Apr. 2021, which is incorporated by reference.

In particular embodiments, a user may perform a checkout for an order with a biometric authentication on a device associated with the user that is connected to one or more biometric information authenticating devices including, but not limited to, a face scanner including a camera, a voice input device including a microphone, a fingerprint scanner, an iris scanner including a camera, a retina scanner including a camera, or a handwriting scanner. The device associated with the user may include, but not limited to, a smartphone, a laptop computer, a desktop computer, or a tablet computer. Although this disclosure describes particular devices associated with a user, this disclosure contemplates any suitable devices associated with a user.

In particular embodiments, the biometric authentication may utilize WebAuthN, which is a standard technology. FIG. 1 illustrates an example logical diagram of WebAuthN that depicts how WebAuthN works in a simplified manner. The system 100 may comprise a server 130, an application 123, and an authenticator 125. The server 130 may be referred to as a relying party. An application 123 may be running on a client device associated with the user 110 and may be used by the user 110 for a particular purpose. The application 123 may communicate with the server 130. Sometimes, the server 130 may need to authenticate the user to perform a particular function. To enable the user 110 to perform an authentication without a password, the authenticator 125 may create a credential comprising an identifier, a private key 143, and a public key 145. During a registration, the identifier and the public key 145 associated with the credential may be transferred to the server 130. In particular embodiments, the application 123 and the authenticator 125 may be on a single device, in which the application 123 accesses API provided by the authenticator performing as a system module 125. In particular embodiments, the authenticator 125 may be separate from the client device the application 123 is running on, in which case a system module on the client device may provide an interface for accessing services of the authenticator 125 to the application 123. The authenticator 125 may be equipped with one or more biometric information input devices including, but not limited to, a face scanner including a camera, a voice input device including a microphone, a fingerprint scanner, an iris scanner including a camera, a retina scanner including a camera, or a handwriting scanner. Once a biometric authentication is initiated, the server 130 may send a unique authentication challenge, which may be a random-generated binary sequence, at step 101. At step 103, the application 123 may call a get API provided by the authenticator 125. The application 123 may provide the authentication challenge received from the server 130 as a parameter to the get API. Once the get API is called, the authenticator 125 may receive a biometric information from the user 110 at step 105. In particular embodiments, the authenticator 125 may request the biometric information to the user 110 before the authenticator 125 takes the biometric information input through an associated biometric information input device. The authenticator 125 may determine whether the received biometric information from the user 110 matches the stored biometric information associated with the credential. In response to the determination, the authenticator 125 may generate a signature, which may be the challenge signed with the private key 143. At step 107, the authenticator 125 may return the get API with the signature. At step 109, the application 123 may send the signature to the server 130. The server 130 may calculate a decrypted challenge by decrypting the received signature with the public key 145. The server 130 may authenticate the user 110 when the decrypted challenge matches the originally created challenge. Although this disclosure describes how WebAuthN works in a particular manner, this disclosure contemplates how WebAuthN works in any manner suitable for carrying out the embodiments disclosed herein.

Figure 2A:
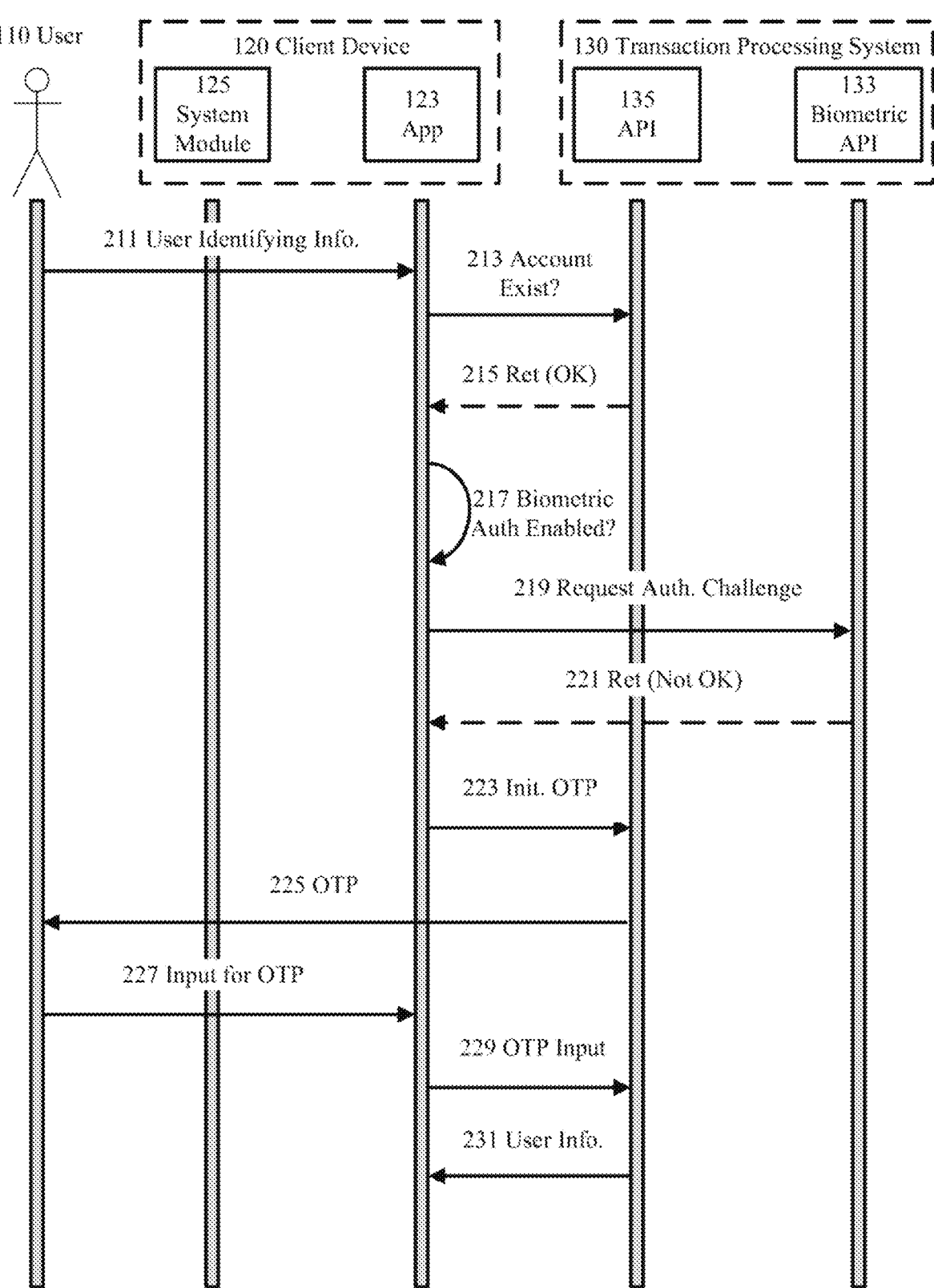
FIG. 2A and FIG. 2B illustrate an example message sequence for registering a device with a transaction processing system for the biometric authentication.
Figure 2B:
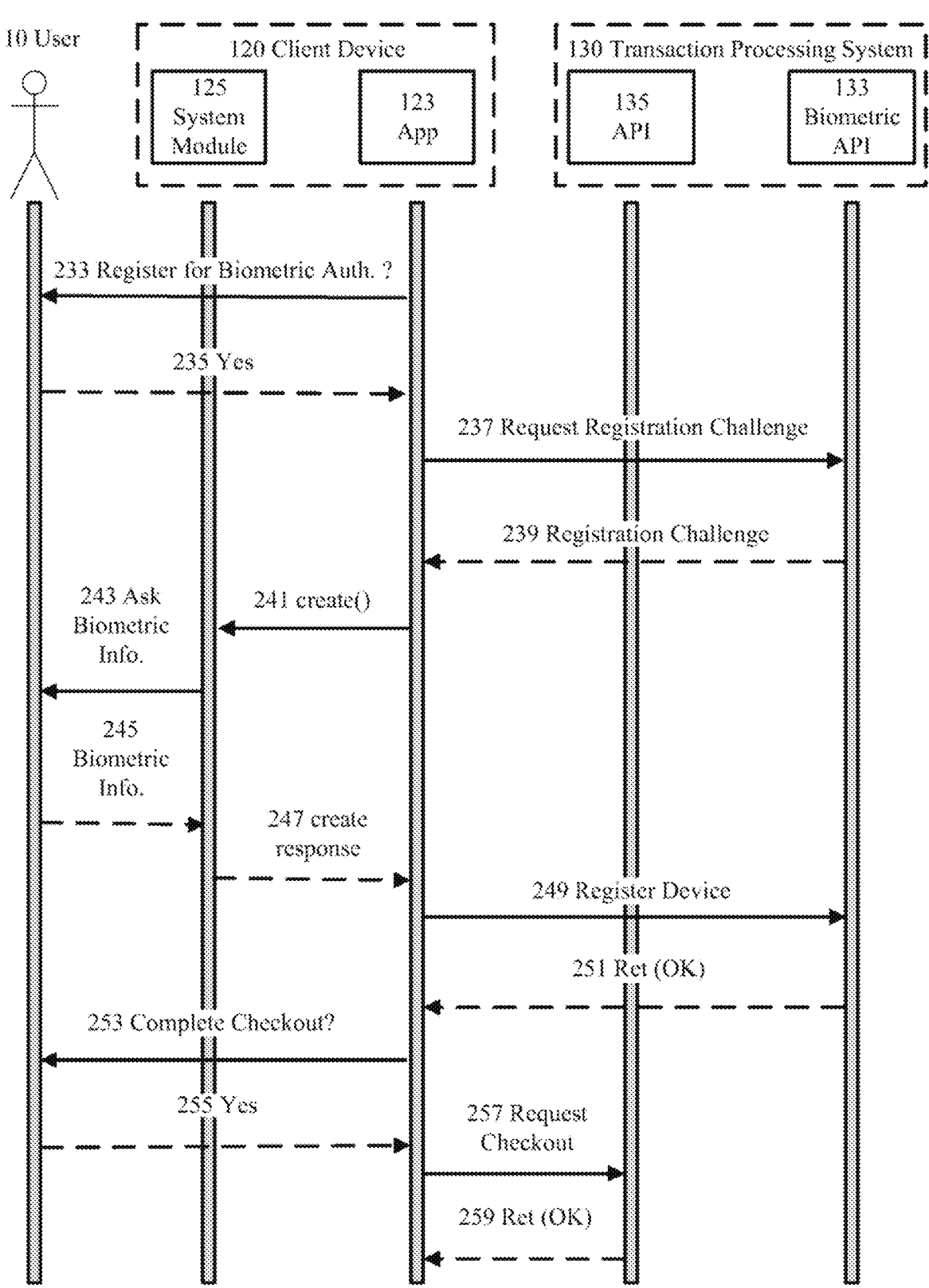

FIG. 2A and FIG. 2B illustrate an example message sequence for registering a device with a transaction processing system for the biometric authentication. In particular embodiments, an application 123 executed on a client device 120 may receive data associated with a first checkout of a first order. The data may comprise a user identifying information. As an example and not by way of limitation, a user 110 may access an online merchant A through an application 123, where the application 123 may be a web application or a native application. In particular embodiments, the application 123 may be a merchant-provided application. In particular embodiments, the application 123 may be a transaction processing system-provided application. In particular embodiments, the application 123 may be a combination of a merchant-provided application and an embedded module provided by the transaction processing system 130. The user 110 may attempt to checkout one or more items from the merchant A on the application 123. The application 123 may receive data associated with the checkout including a user identifying information at step 211. The user identifying information may comprise an email address, a phone number, or any suitable user identifying information. Although this disclosure describes receiving a user identifying information in association with a checkout in a particular manner, this disclosure contemplates receiving a user identifying information in association with a checkout in any suitable manner.

In particular embodiments, the application 123 may send the user identifying information to a transaction processing system 130. The application 123 may determine that a user account with the transaction processing system 130 associated with the user identifying information exists upon receiving a response from the transaction processing system 130 indicating that the user account associated with the user identifying information exists. The user account may be associated with one or more user identifying information, shipping information, and payment information that may be used for the first checkout. In particular embodiments, the transaction processing system 130 may comprise a subsystem providing a general API 135 and a sub-system providing a biometric authentication API 133. In particular embodiments, the transaction processing system 130 may provide services through a single group of APIs. As an example and not by way of limitation, at step 213 the application 123 may send a message to a general API sub-system 135 inquiring whether a user account with the transaction processing system 130 associated with the user identifying information exists. The message at step 213 may comprise the user identifying information received at step 211. At step 215, the application 123 may receive a response message indicating that the user account exists. Although this disclosure describes determining that a user account with the transaction processing system associated with the user identifying information exists in a particular manner, this disclosure contemplates determining that a user account with the transaction processing system associated with the user identifying information exists in any suitable manner.

In particular embodiments, the application 123 may determine that the client device 120 is capable of a biometric authentication. The application 123 may determine that the biometric authentication is enabled on the client device 120. The determinations may be based on configuration information. As an example and not by way of limitation, the application 123 may determine whether the client device 120 is capable of the biometric authentication (e.g., whether the client device 120 is configured with an input device for receiving biometric information) at step 215. In particular embodiments, the application 123 may also determine whether the biometric authentication is enabled for the application 123 on the client device 120. In particular embodiments, the application 123 may determine whether the biometric authentication is enabled for the application without determining whether the client device 120 is capable of the biometric authentication. In particular embodiments, the application 123 may make those determinations based on configuration information. In particular embodiments, the application 123 may communicate with the system module 125 to make such determinations. Although this disclosure describes determining that the biometric authentication is enabled for the application on the client device in a particular manner, this disclosure contemplates determining that the biometric authentication is enabled for the application on the client device in any suitable manner.

In particular embodiments, upon determining that the client device 120 is capable of the biometric authentication and/or that the biometric authentication is enabled on the client device 120, the application 123 may send a request to create a unique biometric authentication challenge to the transaction processing system 130. The application 123 may determine that the biometric authentication for the user account is not registered with the transaction processing system 130 by receiving a response indicating that biometric authentication for the user account has not been registered with the transaction processing system 130 from the transaction processing system 130. As an example and not by way of limitation, the application 123 may send a request to create a unique biometric authentication challenge to the biometric API sub-system 133 at step 219. In particular embodiments, the request may comprise a device identifier for the client device 120. In particular embodiments, the request may comprise a user identifying information. The biometric API sub-system may determine whether the client device has been registered for the biometric authentication of the user account associated with the user identifying information. When the biometric API determines that the client device has not been registered for the biometric authentication, the biometric API may send a response message indicating that the client device is not registered to authenticate using biometric authentication at step 221. The indication may be a pre-determined code, an error code, or a null code. In particular embodiments, the application 123 may determine that the biometric authentication for the user account is not registered with the transaction processing system 130 when no response has been delivered for a pre-determined duration of time (e.g., 5-15 seconds). As another example and not by way of limitation, the application 123 may send a message inquiring whether the client device is registered for the biometric authentication of the user 110 with the transaction processing system 130. The application 123 may determine that the biometric authentication for the user account is not registered with the transaction processing system 130 based on receiving a response indicating that the client device 120 is not registered for the biometric authentication of the user 110 from the transaction processing system 130. Although this disclosure describes determining that the biometric authentication for the user account is not registered with the transaction processing system in a particular manner, this disclosure contemplates determining that the biometric authentication for the user account is not registered with the transaction processing system in any suitable manner.

In particular embodiments, the application 123 may perform an alternative authentication with the transaction processing system 130 in response to the determination that the biometric authentication for the user account is not registered with the transaction processing system 130. In particular embodiments, the alternative authentication comprises a One-Time Password (OTP) authentication. For the OTP authentication, the application 123 may send a request to initiate an OTP authentication to the transaction processing system 130. The request to initiate the OTP authentication may cause the transaction processing system 130 to send an OTP to a user computing device via a communication channel associated with a stored user identifying information for the user account. The application 123 may receive input for the OTP via an input device associated with the client device 120. The application 123 may send the received input for the OTP to the transaction processing system 130. The transaction processing system 130 may compare the received input for the OTP with the OTP sent to the user computing device. The transaction processing system 130 determines that the user account associated with the user identifying information is authenticated when the received input for the OTP is identical to the OTP sent to the user computing device. The application 123 may receive a confirmation that the OTP authentication is complete from the transaction processing system 130. In particular embodiments, the confirmation received by the application 123 may comprise user information to be used for the first checkout. The user information may comprise shipping information and payment information. The application 123 may display the received user information on a display associated with the client device 120. The user 110 may modify the user information to be used for the first checkout if needed. For example, the user 110 may modify the displayed shipping information when the user 110 wants to use different shipping information for the first checkout. The user 110 may modify the displayed payment information when the user 110 wants to use different payment information for the first checkout. When the user 110 modifies the user information, the modified user information may be stored in association with the user account. As an example and not by way of limitation, the application 123 may send a request to initiate an OTP authentication to the general API sub-system 135 at step 223. At step 225, the general API sub-system 135 may send a randomly-generated OTP to a phone associated with a phone number stored in the databased associated with the transaction processing system 130. In particular embodiments, the general API sub-system 135 may send the randomly-generated OTP to any suitable user device via a communication channel associated with a stored user identifying information for the user account. The application 123 may present input field for the OTP at step 227. The user 110 may type the received OTP to the input field. At step 229, the application 123 may send the OTP received from the user 110 at step 227 to the general API sub-system 135. The general API sub-system 135 may compare the randomly-generated OTP and the OTP received at step 229 to authenticate the user. The general API sub-system 135 may send user information associated with the user account to the application 123 at step 231. The user information may comprise shipping information and payment information. In particular embodiments, the user information may also comprise a contact information. The contact information may comprise an email address, a phone number, or any suitable contact information. Although this disclosure describes performing an alternative authentication with the transaction processing system in a particular manner, this disclosure contemplates performing an alternative authentication with the transaction processing system in any suitable manner.

In particular embodiments, the application 123 may obtain a unique biometric authentication registration challenge from the transaction processing system 130 upon receiving an approval for registering for the biometric authentication with the transaction processing system 130. As an example and not by way of limitation, the application 123 may request a user to input whether the user 110 wants to register for the biometric authentication with the transaction processing system 130, at step 233. For example, the application may display a message box with a caption "Do you want to register for the biometric authentication with Bolt?" The message box may also comprise a "Yes" button and a "No" button. At step 235, the application 123 may receive a user confirmation on the registration for the biometric authentication. Continuing with the prior example, the user 110 may click the "Yes" button on the message box. At step 237, the application 123 may send a message requesting a biometric authentication registration challenge to the biometric API sub-system 133. On receiving the request, the biometric API sub-system 133 may randomly generate a registration challenge, which is a random binary sequence. The biometric API sub-system 133 may send the generated biometric authentication registration challenge to the application 123, at step 239. Although this disclosure describes obtaining a unique biometric authentication registration challenge in a particular manner, this disclosure contemplates obtaining a unique biometric authentication registration challenge in any suitable manner.

In particular embodiments, the application 123 may request a creation of a biometric authentication credential to a system module 125 on the client device using a create API provided by the system module 125. The unique biometric authentication registration challenge may be provided to the system module 125 as a parameter of the create API. In particular embodiments, requesting the creation of the credential using the create API may cause the system module 125 to perform the following: the system module 125 may request a biometric information through one or more output devices associated with the client device 120; the system module 125 may receive the biometric information via a biometric information input device associated with the system module 125; the system module 125 may generate an identifier, a private key, and a public key associated with a credential for the biometric authentication; the system module 125 may store the identifier, the private key, and the received biometric information in a secure manner; the system module produce a response to the create API, wherein the response comprises the identifier of the credential, the public key associated with the credential, and a first signature. The first signature may be the unique biometric authentication registration challenge signed by the private key associated with the credential. As an example and not by way of limitation, the application 123 may call a create API provided by the system module 125 at step 241. The application 123 may provide the registration challenge received from the biometric API sub-system 133 at step 239 as a parameter of the create API. In particular embodiments, the application 123 may provide an identity of the transaction processing system 130 as a parameter of the create API. At step 243, the system module 125 may request the user 110 to provide a biometric information through one or more output devices associated with the client device 120. For example, the system module 125 may display an icon representing a fingerprint on a display of the client device 120. At step 245, the user 110 may provide a biometric information, such as a fingerprint through a fingerprint scanner associated with the system module 125. Upon receiving the biometric information from the user 110, the system module 125 may create a credential: an identifier, a private key and a public key associated with the credential. The system module 125 may store the identifier, the private key and the received biometric information in a secure manner. The system module 125 may generate a first signature by signing the registration challenge received at step 241 with the private key. Although this disclosure describes requesting a creation of a biometric authentication credential in a particular manner, this disclosure contemplates requesting a creation of a biometric authentication credential in any suitable manner.

In particular embodiments, the application 123 may receive the first signature, the identifier of the credential, and the public key associated with the credential as a response to the create API from the system module 125. The application 123 may send a biometric authentication registration request to the transaction processing system 130. The biometric authentication registration request may comprise the identifier of the credential, the public key associated with the credential, and the first signature. The application 123 may receive a response to the biometric authentication registration request indicating a successful registration from the transaction processing system 130. As an example and not by way of limitation, at step 247, the system module 125 may return the create API call with the first signature and the identifier and the public key associated with the created credential. At step 249, the application 123 may send a request for registering the client device to the biometric API sub-system 133. The request may comprise the signature and the identifier and the public key received at step 247. At step 251, the application 123 may receive a response to the request for registering the client device indicating that the registration has been successfully complete from the biometric API sub-system 133. Although this disclosure describes completing a biometric authentication registration in a particular manner, this disclosure contemplates completing a biometric authentication registration in any suitable manner.

In particular embodiments, the application 123 may request a confirmation on the first checkout through one or more output devices associated with the client device 120. The one or more output devices may comprise one or more visual display devices, one or more audio output devices, or any suitable output devices available at the client device 120. The application 123 may receive an input indicating the confirmation on the first checkout. The application 123 may send a message indicating a confirmation on the first checkout to the transaction processing system 130. Upon receiving the message from the application 123, the transaction processing system 130 may facilitate the first checkout such that a payment can be made for the first order. The application 123 may receive a response indicating a successful processing of the first checkout from the transaction processing system 130. As an example and not by way of limitation, at step 253, the application may display a message box on a display associated with the client device 120 with a caption "Do you want to proceed to complete the checkout?" The message box may also comprise a "Yes" button and a "No" button. At step 255, the user 110 may click the "Yes" button on the message box. As another example and not by way of limitation, at step 253, the application may display a summary of the first checkout along with a button labelled "Checkout" on the display associated with the client device 120. At step 255, the user 110 may click the "Checkout" button. Upon receiving a confirmation from the user 110 at step 255, the application 123 may send a message indicating a confirmation on the first checkout to the general API sub-system 135 at step 257. On receiving the message indicating the confirmation on the first checkout, the general API sub-system 135 or any other suitable sub-system of the transaction processing system 130 may facilitate the first checkout. At step 259, the general API sub-system 135 may send a response to the application 123 indicating that the first checkout has been successfully processed. Although this disclosure describes completing a first checkout after registering a biometric authentication in a particular manner, this disclosure contemplates completing a first checkout after registering a biometric authentication in any suitable manner.

In particular embodiments, the registration process for biometric authentication, as disclosed herein, may be device-specific, rather than user-specific. For example, if a user registers his/her laptop with biometric authentication, the biometric authentication may only be available when the user uses the laptop. If, for example, the user executes a checkout process on a smart phone instead, biometric authentication may not be available unless the user also registers the smart phone.

Figure 3A:
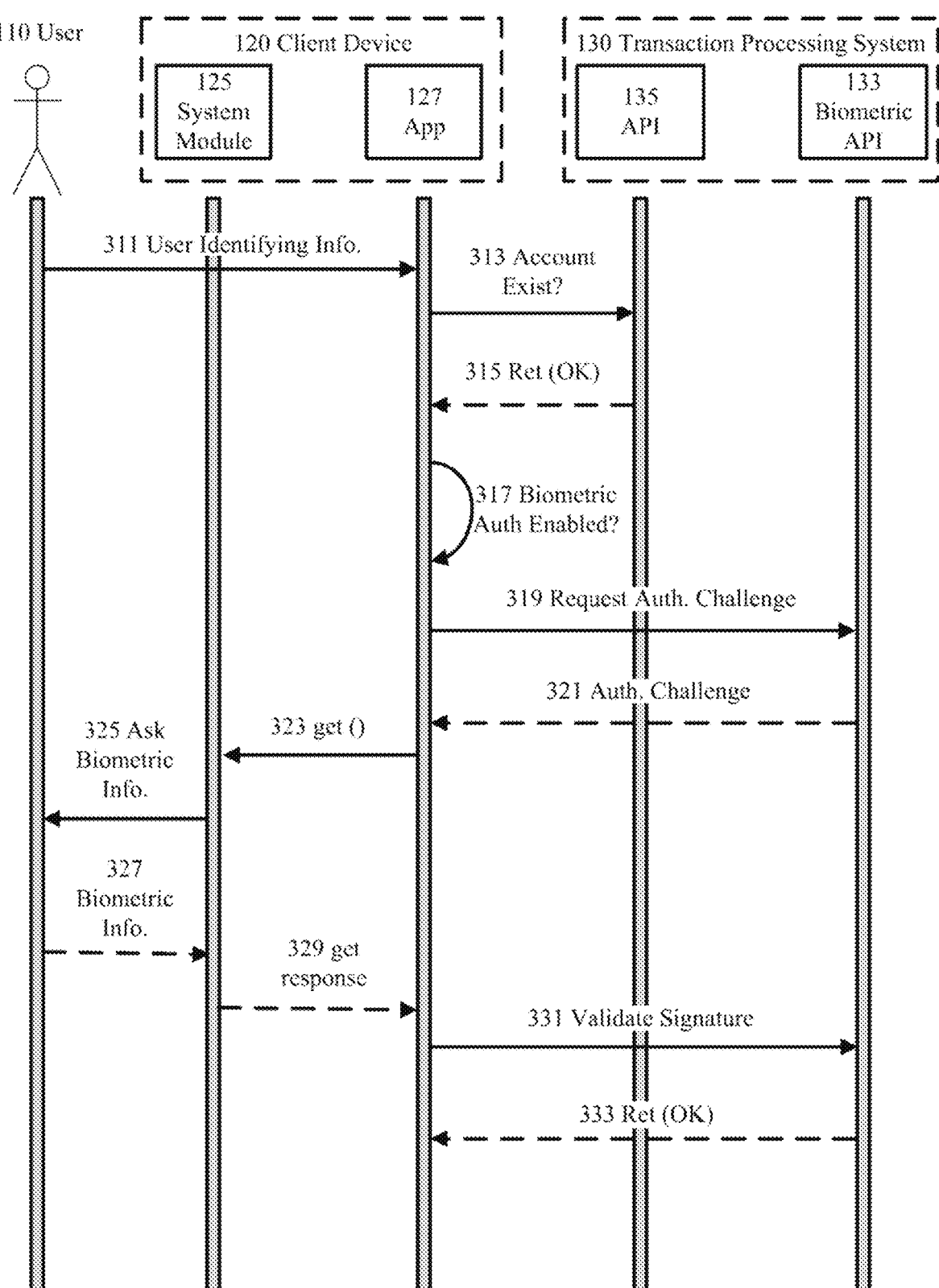
FIG. 3A and FIG. 3B illustrate an example message sequence for a checkout using the registered biometric authentication.
Figure 3B:
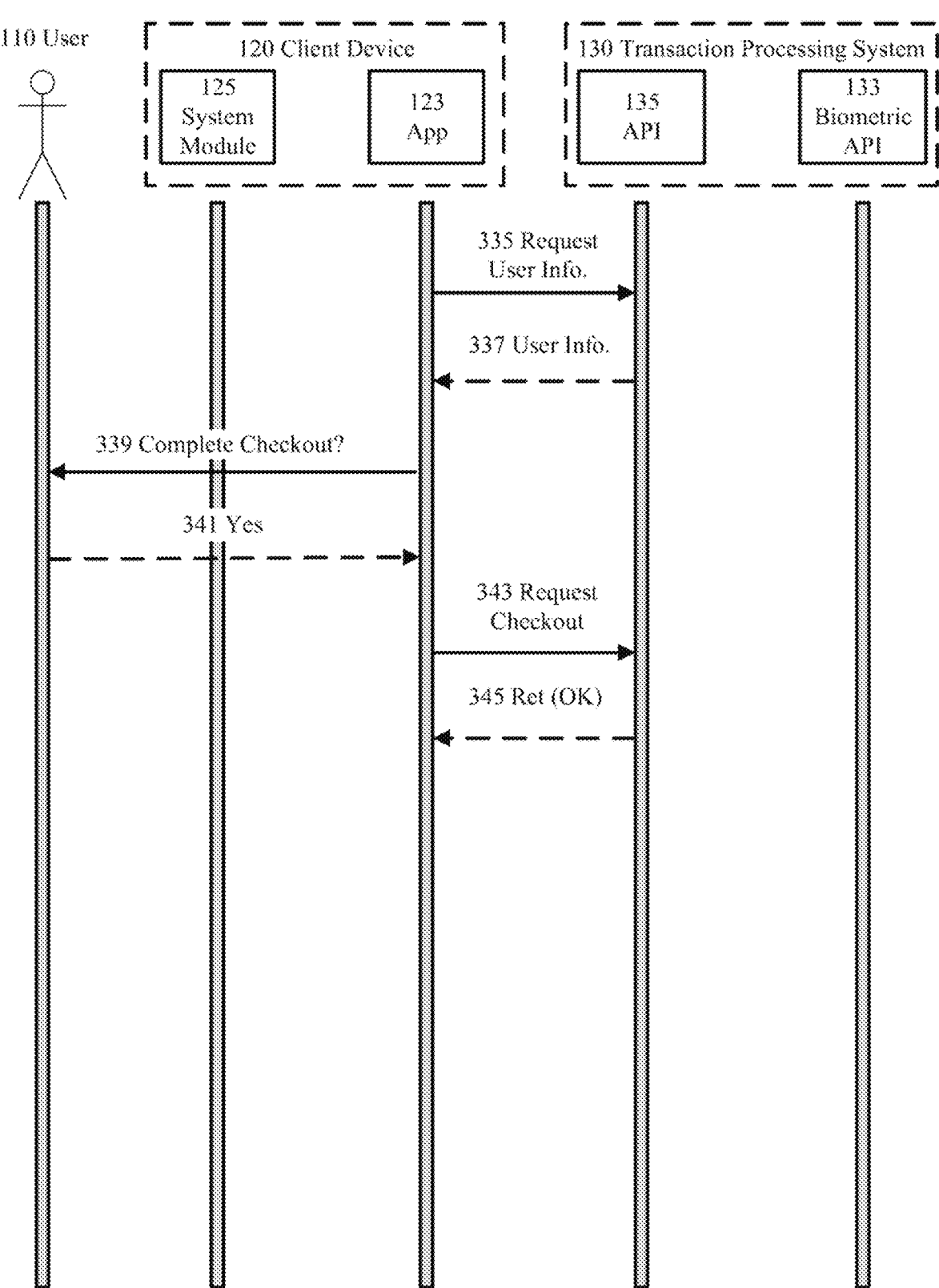

In particular embodiments, the registered biometric authentication may be used for following checkouts. As described herein, a checkout procedure incorporating the biometric authentication may be beneficial by facilitating a faster checkout process, for example, by utilizing biometric authentication instead of using an OTP authentication. Also, if the checkout process is executed on a computing device (e.g., laptop) that is also capable of biometric authentication, a user may only need to use a single device for the checkout process, which is typically not the case when OTP authentication is used (e.g., since, when using OTP, a user may need to receive an OTP on a smart phone, rather than the laptop that may be hosting the application on which the checkout process is occurring). In this way, the checkout process disclosed herein may be made even faster than traditional means, by eliminating the need for the use of multiple computing devices. FIG. 3A and FIG. 3B illustrate an example message sequence for a checkout using the registered biometric authentication. In particular embodiments, the application 127 may receive data associated with a second checkout of a second order. The data associated with the second checkout may comprise the user identifying information. The application 127 may determine that the user account with the transaction processing system associated with the user identifying information exists. As an example and not by way of limitation, the user 110 may access an online merchant B through an application 127 on the client device 120. In particular embodiments, the application 127 may be an identical application to the application 123. In particular embodiments, the application 127 may be different at least in part from the application 123. The user 110 may attempt to checkout one or more items from the merchant B on the application 123. The application 123 may receive data associated with the checkout including a user identifying information at step 311. The user identifying information may comprise an email address, a phone number, or any suitable user identifying information. At step 313 the application 127 may send a message to a general API sub-system 135 inquiring whether a user account with the transaction processing system 130 associated with the user identifying information exists. The message at step 313 may comprise the user identifying information received at step 311. At step 315, the application 127 may receive a response message indicating that the user account exists. Although this disclosure describes determining that the user account with the transaction processing system associated with the user identifying information exists in a particular manner, this disclosure contemplates determining that the user account with the transaction processing system associated with the user identifying information exists in any suitable manner.

In particular embodiments, the application 127 may perform a biometric authentication with the transaction processing system 130. For the biometric authentication with the transaction processing system 130, the application 127 may obtain a unique biometric authentication challenge from the transaction processing system 130. The application 127 may obtain a second signature which may be the unique biometric authentication challenge signed with the private key from the system module 125. The application 127 may send the second signature to the transaction processing system 130. The transaction processing system 130 may verify the second signature by decoding the second signature using the public key associated with the credential. The application 127 may receive a confirmation that the biometric authentication is complete from the transaction processing system 130. As an example and not by way of limitation, the application 127 may determine whether the client device 120 is capable of the biometric authentication at step 317. In particular embodiments, the application 127 may also determine whether the biometric authentication is enabled for the application 127 on the client device 120. In particular embodiments, the application 127 may determine whether the biometric authentication is enabled for the application 127 without determining whether the client device 120 is capable of the biometric authentication. In particular embodiments, the application 127 may make those determinations based on configuration information. In particular embodiments, the configuration information may comprise an indication whether the system module 125 is connected to one or more biometric input devices. In particular embodiments, the configuration information may comprise an indication whether the biometric authentication is enabled for the application 127. In particular embodiments, the application 127 may communicate with the system module 125 to make such determinations. Upon determining that the biometric authentication is enabled for the application 127, the application 127 may send a request to create a unique biometric authentication challenge to the biometric API sub-system 133 at step 319. The biometric API sub-system 133 may determine whether the client device has been registered for the biometric authentication of the user account associated with the user identifying information. At step 321, the biometric API sub-system 133 may send a response to the request to create a unique biometric authentication challenge comprising the unique biometric authentication challenge, which is a random binary sequence, to the application 127. At step 323, the application 127 may call a get API provided by the system module 125. The application 127 may provide the unique biometric authentication challenge received from the biometric API sub-system 133, at step 321, as a parameter of the get API. At steps 325 and 327, the system module 125 may acquire a biometric information from the user 110. Upon receiving the biometric information from the user 110, the system module 125 may generate a second signature, by signing the unique biometric authentication challenge provided at step 323 with the private key. The system module 125 may return the get API call with the second signature at step 329. At step 331, the application 127 may send a message requesting a validation of the second signature to the biometric API sub-system 133. The message may comprise the second signature received at step 329. At step 333, the application 127 may receive a response indicating that the biometric authentication has been successfully complete from the biometric API sub-system 133. Although this disclosure describes performing a biometric authentication with the transaction processing system in a particular manner, this disclosure contemplates performing a biometric authentication with the transaction processing system in any suitable manner.

In particular embodiments, the application 127 may receive user information from the transaction processing system 130 upon completion of the biometric authentication. The user information may comprise one or more user identifying information, shipping information, and payment information associated with the user account. The user information may be used for the second checkout. The application 127 may request a confirmation on the second checkout through one or more output devices associated with the client device 120. The one or more output devices may comprise one or more visual display devices, one or more audio output devices, or any suitable output devices available at the client device 120. The application 127 may receive an input indicating the confirmation on the second checkout. The application 127 may complete the second checkout by sending a message indicating a confirmation on the second checkout to the transaction processing system 130. The application 127 may receive a response indicating a successful processing of the second checkout from the transaction processing system 130. As an example and not by way of limitation, the application 127 may send a request for user information to the general API sub-system 135 at step 335. At step 337, the application 127 may receive a response to the request comprising user information. The user information may comprise shipping information and payment information. In particular embodiments, the user information may also comprise a contact information. The application 127 may display the received user information on a display associated with the client device 120. The user 110 may modify the user information to be used for the second checkout if needed. For example, the user 110 may modify the displayed shipping information when the user 110 wants to use different shipping information for the second checkout. The user 110 may modify the displayed payment information when the user 110 wants to use different payment information for the second checkout. When the user 110 modifies the user information, the modified user information may be stored in association with the user account. In particular embodiments, the application may display a message box on a display associated with the client device 120 with a caption "Do you want to proceed to complete the checkout?" At step 339. The message box may also comprise a "Yes" button and a "No" button. At step 341, the user 110 may click the "Yes" button on the message box. In particular embodiments, at step 339, the application 127 may display a summary of the second checkout along with a button labelled "Checkout" on the display associated with the client device 120. At step 341, the user 110 may click the "Checkout" button. Upon receiving a confirmation from the user 110 at step 341, the application 127 may send a message indicating a confirmation on the second checkout to the general API sub-system 135 at step 343. On receiving the message indicating the confirmation on the second checkout, the general API sub-system 135 or any other suitable sub-system of the transaction processing system 130 may facilitate the second checkout. At step 345, the general API sub-system 135 may send a response indicating that the second checkout has been successfully processed to the application 127. Although this disclosure describes completing a checkout after performing a biometric authentication in a particular manner, this disclosure contemplates completing a checkout after performing a biometric authentication in any suitable manner.

FIG. 4 illustrates an example method 400 for registering a biometric authentication with a transaction processing system. The method may begin at step 410, where an application executed on a client device may receive data associated with a first checkout of a first order. The data may comprise a user identifying information. At step 420, the application may determine that a user account with a transaction processing system associated with the user identifying information exists. At step 430, the application may determine that a biometric authentication for the user account is not registered with the transaction processing system. At step 440, the application may perform an alternative authentication with the transaction processing system in response to the determination that the biometric authentication for the user account is not registered with the transaction processing system. At step 450, the application may obtain a unique biometric authentication registration challenge from the transaction processing system. At step 460, the application may obtain an identifier of a credential for biometric authentications, a public key associated with the credential, and a first signature from a system module on the client device. The first signature may be the unique biometric authentication registration challenge signed by a private key associated with the credential. At step 470, the application may send a biometric authentication registration request comprising the identifier of the credential, the public key associated with the credential, and the first signature to the transaction processing system. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for registering a biometric authentication with a transaction processing system including the particular steps of the method of FIG. 4, this disclosure contemplates any suitable method for registering a biometric authentication with a transaction processing system including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
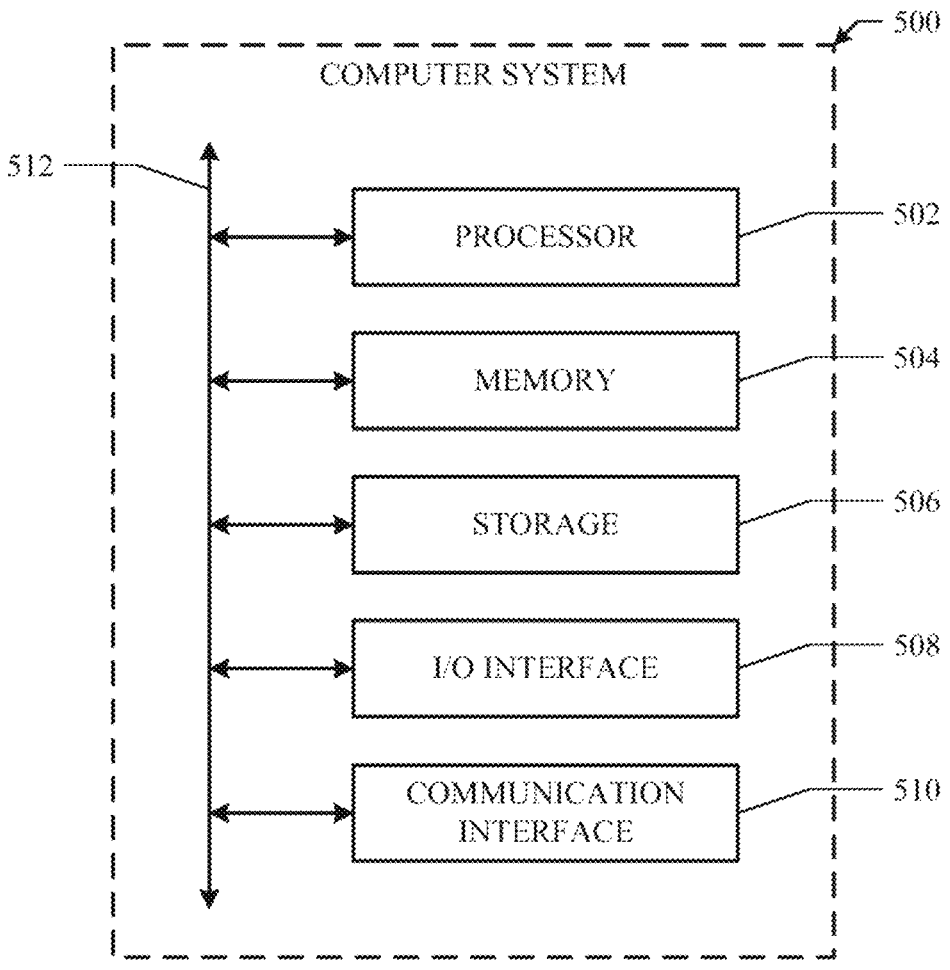
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, any reference herein to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method executed by an application executed on a client device, the method comprising:

receiving data associated with a first checkout of a first order, wherein the data comprises a user identifying information;

identifying, based on the user identifying information, a user account with a transaction processing system;

determining that a biometric authentication for the user account is not registered with the transaction processing system;

performing, in response to the determination that the biometric authentication for the user account is not registered with the transaction processing system, an alternative authentication with the transaction processing system;

initiating, in response to performing the alternative authentication, a biometric authentication registration procedure by sending a request for a unique biometric authentication registration challenge;

receiving, from the transaction processing system, the unique biometric authentication registration challenge;

sending, to a system module on the client device, a request to create a credential for biometric authentications, the request to create the credential comprising the unique biometric authentication registration challenge, wherein the request to create the credential causes the system module to:

receive biometric information from a user through a biometric information input device associated with the system module, generate an identifier, a private key, and a public key associated with the credential, generate a first signature by signing the unique biometric authentication registration challenge by the private key, and store the identifier, the private key, and the received biometric information in a secure manner such that the private key is accessible only when biometric information matching the stored biometric information is provided by the user;

receiving, from the system module on the client device, the identifier of the credential for biometric authentications, the public key associated with the credential, and the first signature; and sending, to the transaction processing system, a request to register the biometric authentication for the user account with the identifier of the credential, the public key associated with the credential, and the first signature, wherein registering the biometric authentication with the transaction processing system enables the user account to use the biometric authentication for a subsequent checkout of a subsequent order.

2. The method of claim 1, wherein identifying, based on the user identifying information, the user account with the transaction processing system comprises:

sending the user identifying information to the transaction processing system; and receiving a response indicating that the user account associated with the user identifying information exists.

3. The method of claim 1, wherein determining that the biometric authentication for the user account is not registered with the transaction processing system comprises:

determining that the client device is capable of the biometric authentication;

determining that a biometric authentication is enabled on the client device;

sending, to the transaction processing system, a request to create a unique biometric authentication challenge; and receiving, from the transaction processing system, a response indicating that biometric authentication for the user account has not been registered with the transaction processing system.

4. The method of claim 1, wherein the alternative authentication comprises a One Time Passcode (OTP) authentication.

5. The method of claim 4, wherein the OTP authentication comprises:

sending, to the transaction processing system, a request to initiate an OTP authentication that causes the transaction processing system to send an OTP to a user computing device via a communication channel associated with a stored user identifying information for the user account;

receiving input for the OTP via an input device associated with the client device;

sending, to the transaction processing system, the received input for the OTP, wherein the received input for the OTP is compared with the OTP sent to the user computing device; and receiving, from the transaction processing system, a confirmation that the OTP authentication is complete.

6. The method of claim 1, wherein obtaining the identifier of the credential, the public key associated with the credential, and the first signature comprises:

requesting, to the system module, a creation of the credential using a create API (Application Programming Interface) provided by the system module, wherein the unique biometric authentication registration challenge is provided to the system module as a parameter of the create API; and receiving, from the system module, as a response to the create API, the first signature, the identifier of the credential, and the public key associated with the credential.

7. The method of claim 6, wherein requesting the creation of the credential using the create API causes the system module to:

request a biometric information through one or more output devices associated with the client device;

receive the biometric information via a biometric information input device associated with the system module;

generate the identifier, the private key, and the public key associated with the credential;

store the identifier, the private key, and the received biometric information in a secure manner; and produce the response to the create API, wherein the response comprises the identifier of the credential, the public key associated with the credential, and the first signature.

8. The method of claim 1, further comprising:

receiving, from the transaction processing system, a response to the request to register the biometric authentication for the user account indicating a successful registration.

9. The method of claim 8, further comprising:

requesting a confirmation on the first checkout through one or more output devices;

receiving an input indicating the confirmation on the first checkout; and sending, to the transaction processing system, a message indicating a confirmation on the first checkout.

10. The method of claim 9, further comprising;

receiving, from the transaction processing system, a response indicating a successful processing of the first checkout.

11. The method of claim 1, further comprising:

receiving data associated with a second checkout of a second order, wherein the data associated with the second checkout comprises the user identifying information;

determining that the user account with the transaction processing system associated with the user identifying information exists;

performing a biometric authentication with the transaction processing system;

receiving, upon completion of the biometric authentication, from the transaction processing system, user information; and completing the second checkout.

12. The method of claim 11, wherein performing the biometric authentication with the transaction processing system comprises:

obtaining, from the transaction processing system, a unique biometric authentication challenge;

obtaining, from the system module, a second signature which is the unique biometric authentication challenge signed by the private key; and sending, to the transaction processing system, the second signature, wherein the transaction processing system verifies the second signature by decoding the second signature using the public key associated with the credential.

13. The method of claim 12, wherein performing the biometric authentication with the transaction processing system further comprises:

receiving, from the transaction processing system, a confirmation that the biometric authentication is complete.

14. The method of claim 11, wherein completing the second checkout comprises:

requesting a confirmation on the second checkout through one or more output devices;

receiving an input indicating the confirmation on the second checkout; and sending, to the transaction processing system, a message indicating a confirmation on the second checkout.

15. The method of claim 14, further comprising;

receiving, from the transaction processing system, a response indicating a successful processing of the second checkout.

16. One or more computer-readable non-transitory storage media embodying software that is operable when executed by an application on client device to:

receive data associated with a first checkout of a first order, wherein the data comprises a user identifying information;

identify, based on the user identifying information, a user account with a transaction processing system;

determine that a biometric authentication for the user account is not registered with the transaction processing system;

perform, in response to the determination that the biometric authentication for the user account is not registered with the transaction processing system, an alternative authentication with the transaction processing system;

initiate, in response to performing the alternative authentication, a biometric authentication registration procedure by sending a request for a unique biometric authentication registration challenge;

receive, from the transaction processing system, the unique biometric authentication registration challenge;

send, to a system module on the client device, a request to create a credential for biometric authentications, the request to create the credential comprising the unique biometric authentication registration challenge, wherein the request to create the credential causes the system module to:

receive biometric information from a user through a biometric information input device associated with the system module, generate an identifier, a private key, and a public key associated with the credential, generate a first signature by signing the unique biometric authentication registration challenge by the private key, and store the identifier, the private key, and the received biometric information in a secure manner such that the private key is accessible only when biometric information matching the stored biometric information is provided by the user;

receive, from the system module on the client device, the identifier of the credential for biometric authentications, the public key associated with the credential, and the first signature; and send, to the transaction processing system, a request to register the biometric authentication for the user account with the identifier of the credential, the public key associated with the credential, and the first signature, wherein registering the biometric authentication with the transaction processing system enables the user account to use the biometric authentication for a subsequent checkout of a subsequent order.

17. The media of claim 16, wherein identifying, based on the user identifying information, the user account with the transaction processing system comprises:

sending the user identifying information to the transaction processing system; and receiving a response indicating that the user account associated with the user identifying information exists.

18. The media of claim 16, wherein determining that the biometric authentication for the user account is not registered with the transaction processing system comprises:

determining that the client device is capable of the biometric authentication;

determining that a biometric authentication is enabled on the client device;

sending, to the transaction processing system, a request to create a unique biometric authentication challenge; and receiving, from the transaction processing system, a response indicating that biometric authentication for the user account has not been registered with the transaction processing system.

19. A system associated with a client device comprising: one or more processors; and one or more computer-readable non-transitory storage media coupled to one or more of the processors and comprising instructions operable when executed by one or more of the processors to cause the system to perform operations comprising:

receive data associated with a first checkout of a first order, wherein the data comprises a user identifying information;

identify, based on the user identifying information, a user account with a transaction processing system;

determine that a biometric authentication for the user account is not registered with the transaction processing system;

perform, in response to the determination that the biometric authentication for the user account is not registered with the transaction processing system, an alternative authentication with the transaction processing system;

initiate, in response to performing the alternative authentication, a biometric authentication registration procedure by sending a request for a unique biometric authentication registration challenge;

receive, from the transaction processing system, the unique biometric authentication registration challenge;

send, to a system module on the client device, a request to create a credential for biometric authentications, the request to create the credential comprising the unique biometric authentication registration challenge, wherein the request to create the credential causes the system module to:

receive biometric information from a user through a biometric information input device associated with the system module, generate an identifier, a private key, and a public key associated with the credential, generate a first signature by signing the unique biometric authentication registration challenge by the private key, and store the identifier, the private key, and the received biometric information in a secure manner such that the private key is accessible only when biometric information matching the stored biometric information is provided by the user;

receive, from the system module on the client device, the identifier of the credential for biometric authentications, the public key associated with the credential, and the first signature; and send, to the transaction processing system, a request to register the biometric authentication for the user account with the identifier of the credential, the public key associated with the credential, and the first signature, wherein registering the biometric authentication with the transaction processing system enables the user account to use the biometric authentication for a subsequent checkout of a subsequent order.

20. The system of claim 19, wherein identifying, based on the user identifying information, the user account with the transaction processing system comprises:

sending the user identifying information to the transaction processing system; and receiving a response indicating that the user account associated with the user identifying information exists.

* * * * *